(12) United States Patent
Shimada

(10) Patent No.: US 7,862,267 B2
(45) Date of Patent: *Jan. 4, 2011

(54) ROTARY CUTTING MACHINE

(75) Inventor: Keisuke Shimada, Tokyo (JP)

(73) Assignee: Nitto Kohki Co., Ltd., Tokyo (JP)

( * ) Notice: Subject to any disclaimer, the term of this patent is extended or adjusted under 35 U.S.C. 154(b) by 164 days.

This patent is subject to a terminal disclaimer.

(21) Appl. No.: 12/355,292

(22) Filed: Jan. 16, 2009

(65) Prior Publication Data

US 2009/0129880 A1    May 21, 2009

Related U.S. Application Data

(63) Continuation of application No. 10/570,391, filed on Mar. 1, 2006, now Pat. No. 7,494,306.

(30) Foreign Application Priority Data

Jul. 16, 2004  (JP)  ............................. 2004-209624
Aug. 5, 2004  (JP)  ............................. 2004-229766

(51) Int. Cl.
*B23C 1/20* (2006.01)
*B23B 45/14* (2006.01)
*B23B 47/18* (2006.01)
*B23Q 5/32* (2006.01)

(52) U.S. Cl. .................... 409/185; 409/182; 409/218; 408/76; 408/135; 408/136; 408/141

(58) Field of Classification Search ............... 409/175, 409/182, 185, 206, 210, 214, 218; 408/76, 408/88, 129, 135, 136, 141, 142
See application file for complete search history.

(56) References Cited

U.S. PATENT DOCUMENTS 815,697 A * 3/1906 Hagman ................. 409/185
2,748,630 A   6/1956 Dillon
2,796,767 A   6/1957 Carpenter (Continued)

FOREIGN PATENT DOCUMENTS

JP    3-15009 U    2/1991

(Continued)

OTHER PUBLICATIONS

Extended European Search Report issued Aug. 13, 2008 in European application No. 05766516.8.

(Continued)

*Primary Examiner*—Erica E Cadugan
(74) *Attorney, Agent, or Firm*—Brinks Hofer Gilson & Lione

(57) ABSTRACT

A rotary cutting machine 10 has a machine body 14 and an arbor 18. The arbor 18 includes a proximal rotary shaft 22 mounted to the machine body 14 for rotation, an intermediate rotary shaft 24 telescopically connected to the proximal rotary shaft via a splined connection, and a distal rotary shaft 26 telescopically connected to the intermediate rotary shaft 24 via a splined connection. A cutting tool C secured to the arbor 18 is extended and retracted via a feed mechanism 20 including first, second, and third racks 30, 31, and 32, and first and second pinions 33, 34.

2 Claims, 7 Drawing Sheets

U.S. PATENT DOCUMENTS

| | | | |
|---|---|---|---|
| 2,869,403 A | 1/1959 | Bent | |
| 2,887,911 A | * 5/1959 | Bunting | 408/135 |
| 3,411,385 A | 11/1968 | Quackenbush | |
| 3,552,238 A | 1/1971 | Quackenbush | |
| 3,757,638 A | 9/1973 | Martin | |
| 3,782,501 A | 1/1974 | Pagella | |
| 4,111,590 A | 9/1978 | Burkart et al. | |
| 4,664,565 A | 5/1987 | Palm | |
| 4,693,646 A | 9/1987 | Andrews | |
| 4,753,556 A | 6/1988 | Solko | |
| RE33,145 E | 1/1990 | Palm | |
| 5,007,776 A | 4/1991 | Shoji | |
| 5,035,549 A | 7/1991 | Asano et al. | |
| 5,638,993 A | 6/1997 | Hing | |
| 6,102,633 A | 8/2000 | Uehlein-Proctor | |
| 6,280,123 B1 | 8/2001 | Gill | |
| 7,001,117 B2 | * 2/2006 | Mikiya et al. | 408/76 |
| 7,494,306 B2 | * 2/2009 | Sihmada | 409/136 |
| 2004/0191018 A1 | 9/2004 | Mikiya et al. | |
| 2005/0025586 A1 | 2/2005 | Mikiya et al. | |
| 2008/0008547 A1 | 1/2008 | Hidaka | |

FOREIGN PATENT DOCUMENTS

| | | |
|---|---|---|
| JP | 4-189406 A | 7/1992 |
| WO | WO 00/54915 A1 | 9/2000 |

OTHER PUBLICATIONS

Extended Search Report dated Feb. 27, 2009.

* cited by examiner

ROTARY CUTTING MACHINE

RELATED APPLICATIONS

This application is a continuation application of U.S. application Ser. No. 10/570,391 filed on Mar. 1, 2006, now U.S. Pat. No. 7,494,306, which claims priority to Japanese Patent Application Nos. JP2004-209624 filed on Jul. 16, 2004 and JP2004-229766 filed on Aug. 5, 2004, the contents of which are hereby incorporated by references entirely.

FIELD OF THE INVENTION

The present invention relates to rotary cutting machines such as power driven drills and more particularly, to a rotary cutting machine furnished with a device for feeding a cutting oil to a rotary cutting tool.

BACKGROUND OF THE INVENTION

A rotary cutting machine particularly designed for on-site use rather than for factory use is, in some cases, inclined to accommodate various orientations of workpieces. Typically, this type of rotary cutting machine is provided with an oil reservoir within which cutting oil is contained. The oil reservoir has a vent hole positioned above the level of the cutting oil and communicated with ambient air (see, for example, Japanese utility model application publication No. 3-15009). To smoothly feed the cutting oil, the level of the cutting oil within the oil reservoir is made higher than the level at which the cutting oil is fed to a cutting tool.

To facilitate on-site use, there is a need for a compact and lightweight rotary cutting machine which allows a cutting tool to have a sufficient degree of cutting stroke. Various attempts have been made to meet these needs. See, for example, Japanese patent application publication Nos. 2002-538976 and 2005-22055.

It is an object of the present invention to provide a rotary cutting machine which can smoothly feed a cutting oil to a cutting tool without leakage, in the event that the rotary cutting machine is inclined at a relatively large angle so that the machine is properly placed against a workpiece, and which is compact and lightweight and allows the cutting tool to have a sufficient degree of cutting stoke.

SUMMARY OF THE INVENTION

According to one aspect of the present invention, there is provided a rotary cutting machine comprised of a machine body including a rotatable arbor adapted to hold a rotary cutting tool which is rotated with the arbor about the central axis of rotation of the arbor, an oil tank adapted to feed a cutting oil to the rotary cutting tool and mounted to the machine body with the oil tank being oriented in a given angular position about the central axis of rotation of the arbor wherein the arbor includes an inlet port for receiving the cutting oil from the oil tank, an outlet port for directing the cutting oil to the rotary cutting tool, and an oil line axially extending from the inlet port to the outlet port, wherein the oil tank has an interior space divided into a first interior part and a second interior part by an imaginary plane containing the central axis of rotation of the arbor, with the first interior part being less in volume than the second interior part.

When the rotary cutting machine is inclined, the orientation of the oil tank is adjusted so that the first interior part of a relatively small volume is located below the second interior part of a relatively large volume. This configuration makes it possible to raise, in a relative sense, the level of the cutting oil within the oil tank and thus, ensures positive supply of the cutting oil to the rotary cutting tool when the machine body is inclined at a relatively large angle.

In one embodiment, the oil tank includes a tank body configured to sealingly contain the cutting oil and including an oil outlet communicated with the inlet port of the arbor, a float, and a flexible vent pipe mounted within the oil tank. The vent pipe has one end communicated with ambient atmosphere outside of the oil tank and the other end to which the float is connected. The float allows the other end of the vent pipe to be located above the level of the cutting oil within the tank body.

This arrangement avoids leakage of the cutting oil from the oil tank regardless of the angle of inclination of the machine body.

In another embodiment, the machine body includes a housing surrounding the arbor and including a cylindrical oil tank mount extending outwardly from the housing and disposed in a coaxial relation to the arbor. The oil tank mount has a through cavity communicated with the inlet port of the arbor. The oil tank includes a joint secured to the oil tank mount and having a split clamping ring disposed around the oil tank mount and a fastener for securing the clamping ring to the oil tank mount.

This arrangement allows the oil tank to be oriented in the desired angular position about the central axis of rotation of the arbor when or after the oil tank is mounted to the machine body.

Optionally, a hose fitting may be mounted to the oil tank mount when the oil tank is not in use. The hose fitting may be in the form of a cap fitted over the oil tank mount and including an outwardly extending connecting pipe adapted for connection with an external oil hose so that an cutting oil can be fed from the oil hose to the through cavity of the oil tank mount.

The cutting oil can not be fed to the cutting tool if the machine body is unduly inclined (for example, placed upside down). To this end, an external hose is connected to the hose fitting to feed a cutting oil to the cutting tool.

In a preferred embodiment, the tank body has a bottom wall mounted to the machine body and having a peripheral edge, a peripheral wall extending from the peripheral edge of the bottom wall in a direction away from the machine body and a top wall attached to the peripheral wall and spaced a predetermined distance from the bottom wall. The oil outlet is disposed in the bottom wall adjacent to a part of the peripheral wall of the tank body where the first interior part is located.

According to another aspect of the present invention, there is provided a rotary cutting machine comprised of a machine body including a rotatable arbor and adapted to hold a rotary cutting tool which is rotated with the arbor about the central axis of rotation of the arbor, and an oil tank mounted to the machine body and adapted to feed a cutting oil to the rotary cutting tool, wherein the arbor includes an inlet port for receiving the cutting oil from the oil tank, an outlet port for directing the cutting oil to the rotary cutting tool, and an oil line axially extending from the inlet port to the outlet port, and wherein the oil tank includes a tank body configured to sealingly contain the cutting oil and including an oil outlet communicated with the inlet port of the arbor, a float and a flexible vent pipe mounted within the tank body and having one end communicated with ambient atmosphere outside of the oil tank. The float is connected to the other end of the vent pipe to allow the other end of the vent pipe to be located above the level of the cutting oil within the tank body.

Advantageously, the rotary cutting machine avoids leakage of the cutting oil from the oil tank regardless of the angle of inclination of the machine during a cutting process. The tank body may therefore be made to be mountable to the machine body so that the tank body is oriented in a given angular position relative to the machine body, in particular, about the central axis of rotation of the arbor.

In one embodiment, the arbor includes a proximal rotary shaft mounted to the machine body for rotation about the central axis of rotation and drivingly connected to a motor, an intermediate rotary shaft telescopically connected to the proximal rotary shaft and movable between an extended position wherein the proximal rotary shaft and the intermediate rotary shaft are axially overlapped with one another by a relatively short axial length and a retracted position wherein the proximal rotary shaft and the intermediate rotary shaft are axially overlapped with one another by a relatively long axial length, the intermediate rotary shaft being rotated with the proximal rotary shaft, a distal rotary shaft telescopically connected to the intermediate rotary shaft and moved between an extended position wherein the intermediate rotary shaft and the distal rotary shaft are axially overlapped with one another by a relatively short axial length and a retracted position wherein the intermediate rotary shaft and the distal rotary shaft are axially overlapped with one another by a relatively long axial length, and rotated with the intermediate rotary shaft, the rotary cutting tool being secured to the leading end of the distal rotary shaft, a cylindrical holder configured to rotatably support the distal rotary shaft and mounted to the machine body so that the cylindrical holder is axially movable with the distal rotary shaft, and a cylindrical guide axially movably mounted to the machine body and adapted to axially movably hold and rotationally secure the cylindrical holder. The rotary cutting machine also includes a feed mechanism which includes a first pinion rotatably mounted to the machine body, a first rack formed on the outer peripheral surface of the cylindrical holder and extending parallel to the central axis of rotation, a second rack formed on the outer peripheral surface of the cylindrical guide, disposed in parallel relation to the central axis of rotation and meshed with the first pinion, a third rack formed on the machine body and extending parallel to the first rack, and a second pinion rotatably mounted to the cylindrical guide and meshed with the first and third racks. The cylindrical guide is axially displaced upon rotation of the first pinion to cause the second pinion to be moved along the third rock so that by way of the first rack, the distal rotary shaft and the intermediate rotary shaft are moved between the respective extended and retracted positions. The motor includes an output shaft which extends perpendicular to the central axis of rotation of the arbor.

In this way, the rotary cutting machine of the present invention can be brought into a compact arrangement when the machine is not in use. Also, the rotary cutting machine can have a sufficient degree of cutting stoke during a cutting operation.

DETAILED DESCRIPTION OF THE PREFERRED EMBODIMENTS

The present invention will now be described with reference to the accompanying drawings.

Figure 1:
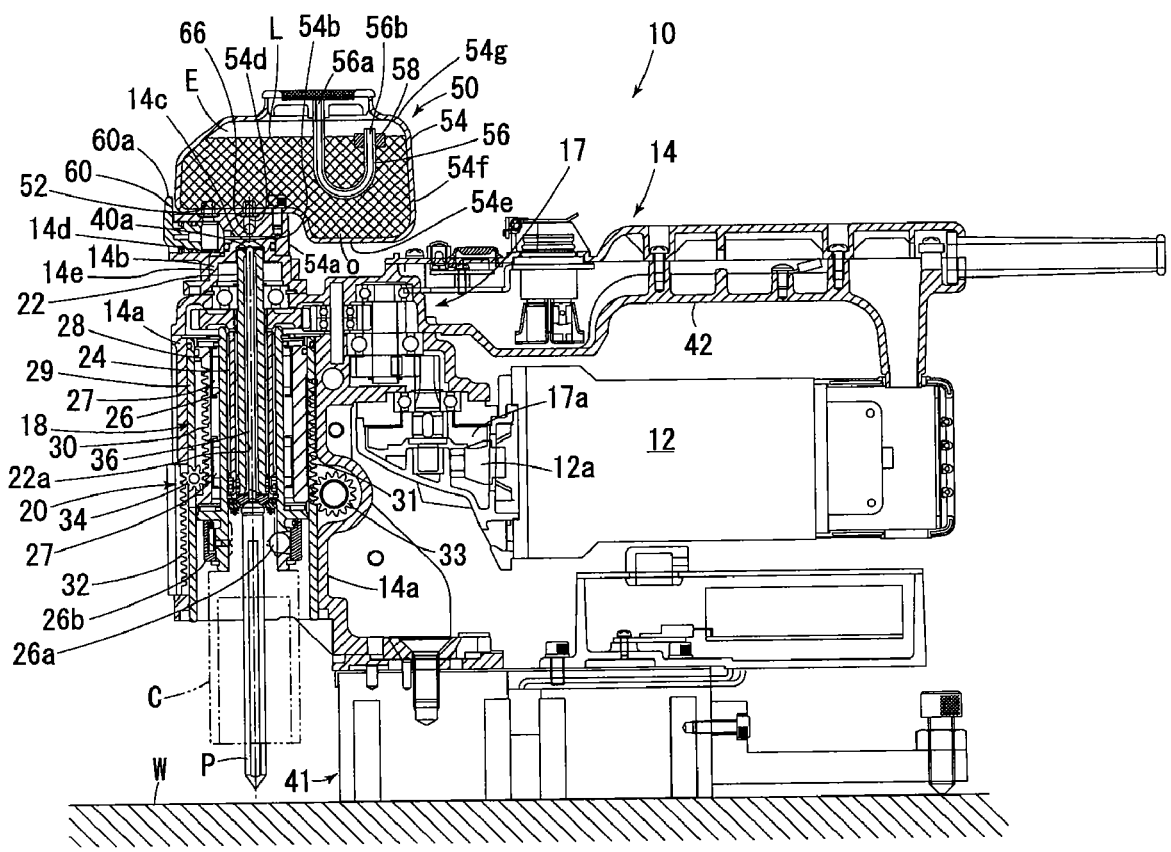
FIG. 1 is a side elevation, in section, of a rotary cutting machine according to the present invention.
Figure 2:
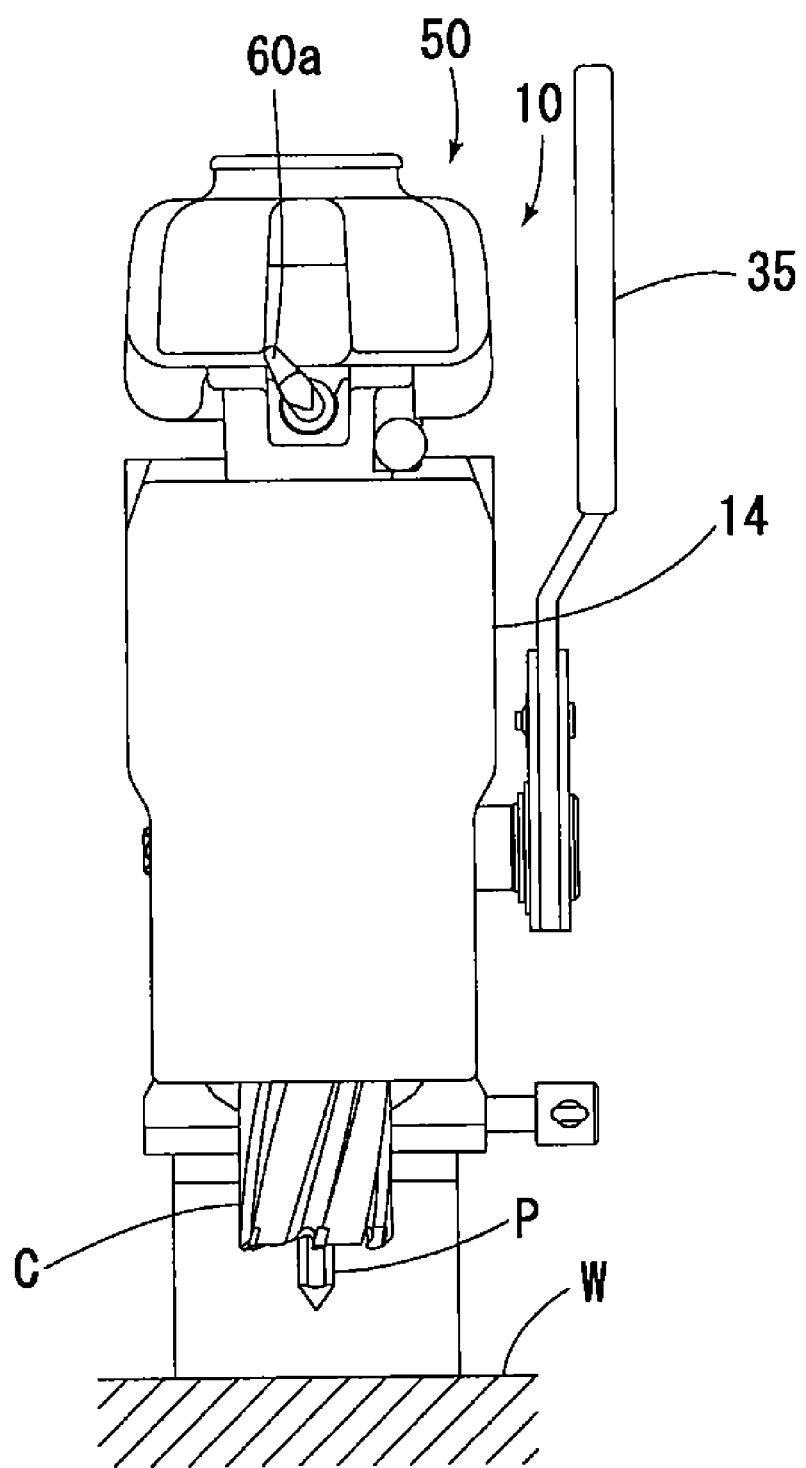
FIG. 2 is a front view of the rotary cutting machine.

FIG. 1 is a side elevation, in section, of a rotary cutting machine (in the illustrated embodiment, in the form of a power driven drill) assembled according to the present invention. FIG. 2 is a front view of the rotary cutting machine. As shown, the rotary cutting machine 10 includes a machine body 14 to which a motor 12 with an output shaft 12a is mounted, an arbor 18 (for rotating a cutting tool) drivingly connected to the output shaft 12a of the motor 12 through a gear train 17 with a bevel gear 17a, a feed mechanism 20 for reciprocatingly moving a cutting tool C (illustratively, in the form of an annular cutter) to and from a workpiece W (in the embodiment shown in FIGS. 1 and 2, made, for example, of steel and horizontally placed below the power driven drill), and an electromagnetic base 41 attached to the lower end of the machine body and adapted to secure the machine body 14 to the workpiece. The rotary cutting tool C is secured to the lower end of the arbor 18. A grip 42 is arranged on the upper section of the machine body 14.

Figure 3:
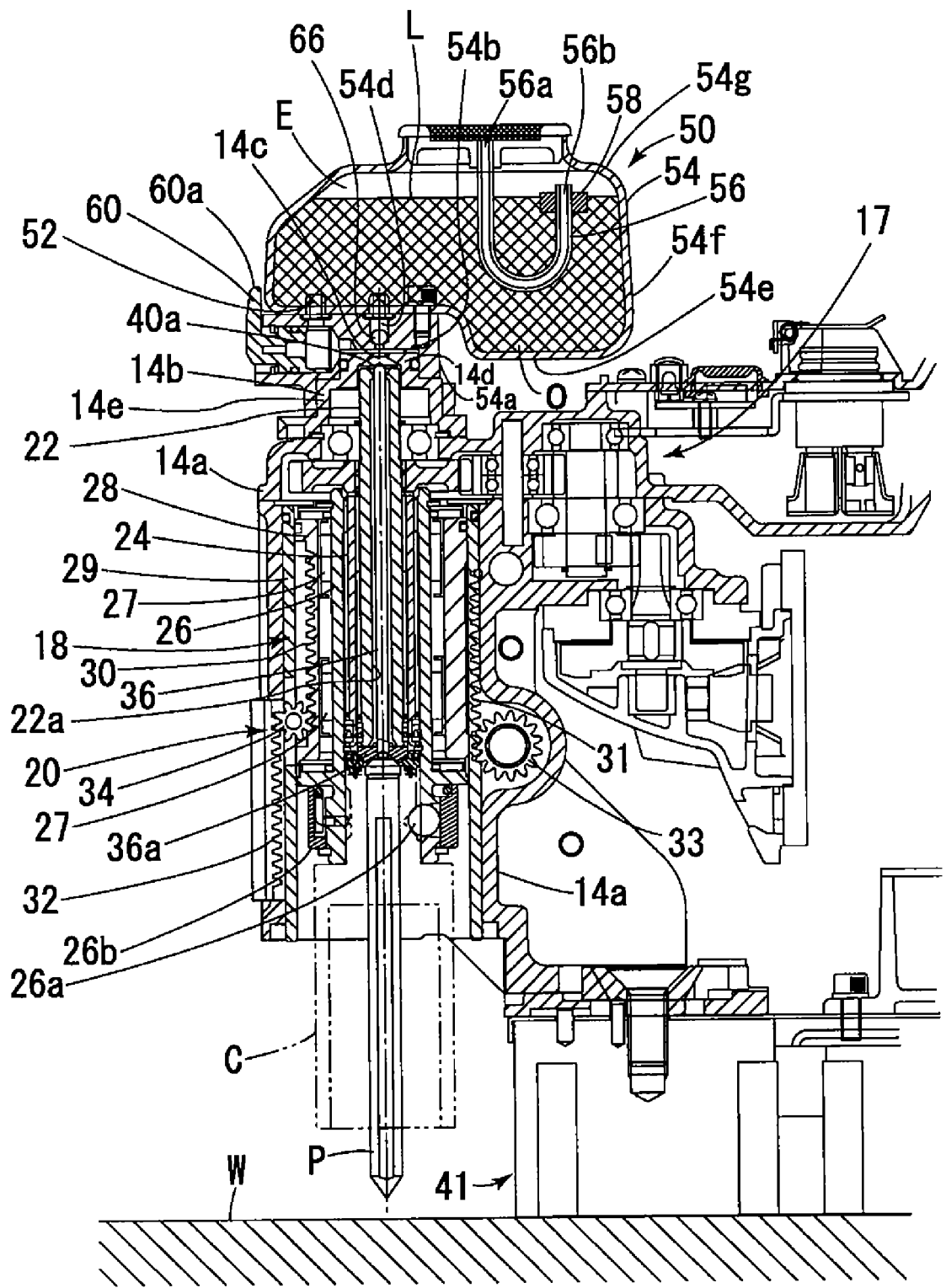
FIG. 3 is an enlarged side elevation, in section, of an arbor incorporated in the rotary cutting machine.
Figure 4:
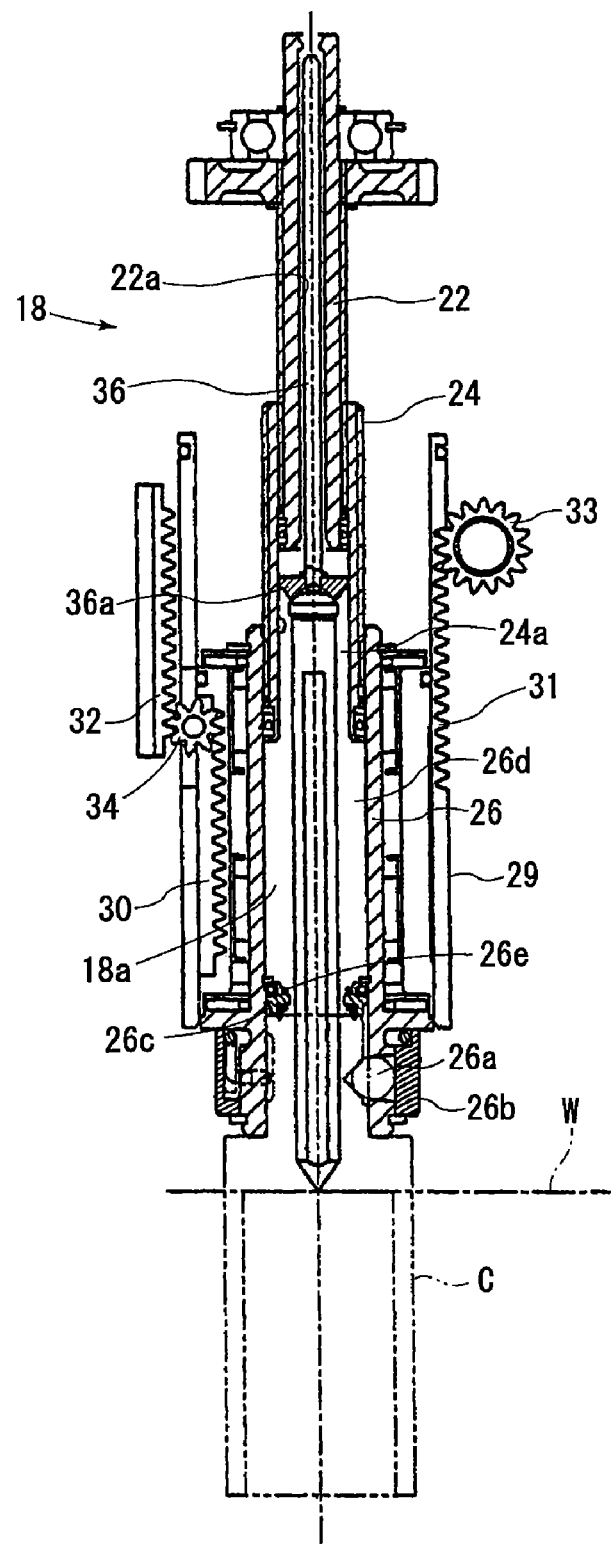
FIG. 4 is a vertical section view of the arbor in its extended position.

As shown better in FIGS. 3 and 4, the arbor 18 includes a proximal rotary shaft 22 mounted to the machine body 14 for rotation about its vertical central axis and drivingly connected to the motor 12 through the gear train 17, an intermediate rotary shaft 24 telescopically and splinedly connected to the proximal rotary shaft 22, moved between an extended position (see FIG. 4) wherein the proximal rotary shaft 22 and the intermediate rotary shaft 24 are axially overlapped with one another by a relatively short axial length and a retracted position (see FIGS. 1 and 3) wherein the proximal rotary shaft 22 and the intermediate rotary shaft 24 are axially overlapped with one another by a relatively long axial length, and rotated with the proximal rotary shaft 22, a distal rotary shaft 26 telescopically and splinedly connected to the intermediate rotary shaft 24 moved between an extended position (see FIG. 4) wherein the intermediate rotary shaft 24 and the distal rotary shaft 26 are axially overlapped with one another by a relatively short axial length and a retracted position (see FIGS. 1 and 3) wherein the intermediate rotary shaft 24 and the distal rotary shaft 26 are axially overlapped with one another by a relatively long axial length, and rotated with the intermediate rotary shaft 24, a cylindrical holder 28 adapted to rotatably support the distal rotary shaft 26 through a needle bearing 27 and mounted to the machine body for axial movement with the distal rotary shaft 26, and a cylindrical guide 29 axially displaceable within a cylindrical portion 14a of the machine body 14 disposed in a coaxial relation to the arbor 18 and adapted to axially move and rotationally secure the cylindrical holder 28. A plurality of locking balls 26a are arranged on the lower end of the distal rotary shaft 26 to hold the annular cutter C in place. A sleeve 26b extends around the lower end of the distal rotary shaft 26. Specifically, the sleeve 26b is rotatable between a locking position (as shown in FIGS. 1 and 3) wherein the locking balls 26a are received in a recess, which is formed in a part of the annular cutter C inserted within the distal rotary shaft 26, to lock the annular cutter C in position and an unlocking position wherein the locking balls 26a are radially outwardly moved and disengaged from the recess.

The feed mechanism 20 includes a straight first rack 30 formed on the outer peripheral surface of the cylindrical holder 28 and extending parallel to the central axis of the arbor 18, a second rack 31 formed on the outer peripheral surface of the cylindrical guide 29 and extending parallel to the first rack 30, a third rack 32 formed on the inner peripheral surface of the (stationary) cylindrical portion 14a of the machine body and extending parallel to the first and second racks, a first pinion 33 rotatably mounted to the machine body and meshed with the second rack 31, and a second pinion 34 rotatably mounted to the cylindrical guide 29 and meshed with the first rack 30 and the third rack 32.

When the rotary cutting machine is not in use, the arbor 18 is held in its retracted position as shown in FIGS. 1 and 3. To cut a hole in the workpiece, the motor 12 is energized to rotate the distal rotary shaft 26 through the proximal rotary shaft 22 and the intermediate rotary shaft 24. The annular cutter C is rotated with the distal rotary shaft 26. The first pinion 33 is then rotated (in a counterclockwise direction in FIG. 4) by means of an operating lever 35 which is in turn, secured to one end of the shaft of the first pinion 33 outside of the machine body 14. This rotation causes downward movement of the cylindrical guide 29. At this time, the second pinion 34 is downwardly moved on and along the third rack 32 while the second pinion 34 is rotated in a clockwise direction. This causes the cylindrical holder 28 to be downwardly moved with the distal rotary shaft 26. It will be noted that the distance of downward movement of the distal rotary shaft 26 is twice as long as the distance of downward movement of the cylindrical guide 29. When the distal rotary shaft 26 reaches the lower end of the intermediate rotary shaft 24, the distal rotary shaft 26 is brought into interlocking engagement with a stopper which is disposed on the lower end of the intermediate rotary shaft 24. As a result of this engagement, the intermediate rotary shaft 24 is forced to be downwardly moved with the distal rotary shaft 26.

FIG. 4 shows the manner in which the distal rotary shaft 26 is moved to its lowest position. With the distal rotary shaft in its lowest position, the first pinion 33 is meshed with the upper end of the second rack 31 since the cylindrical guide 29 is moved to its downward position by means of the first pinion 33. Also the second pinion 34 is meshed with both the lower end of the third rack 32 and the upper end of the first rack 30. The intermediate rotary shaft 24 is in its extended position relative to the proximal rotary shaft 22, and the distal rotary shaft 26 is in its extended position relative to the intermediate rotary shaft 24. Thus, the arbor is fully extended in its entirety.

The proximal rotary shaft 22 has a through oil passage 22a. The oil passage 22a extends along the central axis of the proximal rotary shaft 22. A valve rod 36 is axially moved within the oil passage 22a. With the arbor in its retracted position, a central pilot pin P is held in the position shown in FIGS. 1 and 3. In this state, a valve element 36a, which is connected to the lower end of the valve rod 36, is seated against an annular valve seat 26c which is formed on the inner peripheral surface of the distal rotary shaft 26. This causes closing of an oil line 18a comprised of the oil passage 22a of the proximal rotary shaft 22, an axial through bore 24a (see FIG. 4) of the intermediate rotary shaft 24, and an axial through bore 26d (see FIG. 4) of the distal rotary shaft 26. More specifically, a seal ring 26e is mounted on the valve seat 26c (see FIGS. 3 and 4). The valve element 36a is sealingly engaged with this seal ring 26e to fully close the oil line 18a.

The oil line 18a vertically extends within the arbor 18. When the arbor 18 is moved from its retracted position to its extended position to cut a hole in the workpiece W, the pilot pin P is held in engagement with the workpiece W. In other words, the pilot pin P is upwardly displaced relative to the arbor (particularly the distal rotary shaft 26) when the arbor is extended in a downward direction. As a result of this displacement, the valve element 36a is lifted from the valve seat 26c so as to open the oil line 18a of the arbor 18. With the oil line 18a fully open a cutting oil O is fed from an oil tank 50 to the annular cutter C.

As shown in FIGS. 1 and 3, the oil tank 50 includes a tank body 54 and a flexible vent pipe 56 mounted within the tank body 54. The tank body 54 has an oil outlet 52 communicated with the inlet port 18b of the arbor 18. The vent pipe 56 has an end 56a communicated with ambient atmosphere outside of the oil tank and an other end 56b. A float 58 is mounted to the other end 56b of the vent pipe 56. The float 58 causes the other end 56b of the vent pipe 56 to be exposed to an air E which is present above the level of the cutting oil O within the tank body 54.

In the illustrated embodiment, the machine body 14 has a generally cylindrical portion 14a to house the arbor 18. A cylindrical oil tank mount 14a (see FIGS. 3 and 7) extends upwardly from the upper end of the cylindrical portion 14a and is disposed in a coaxial relation to the arbor 18. The oil tank mount 14a has a through cavity 14c communicated with the inlet port 18b of the arbor 18.

Figure 5:
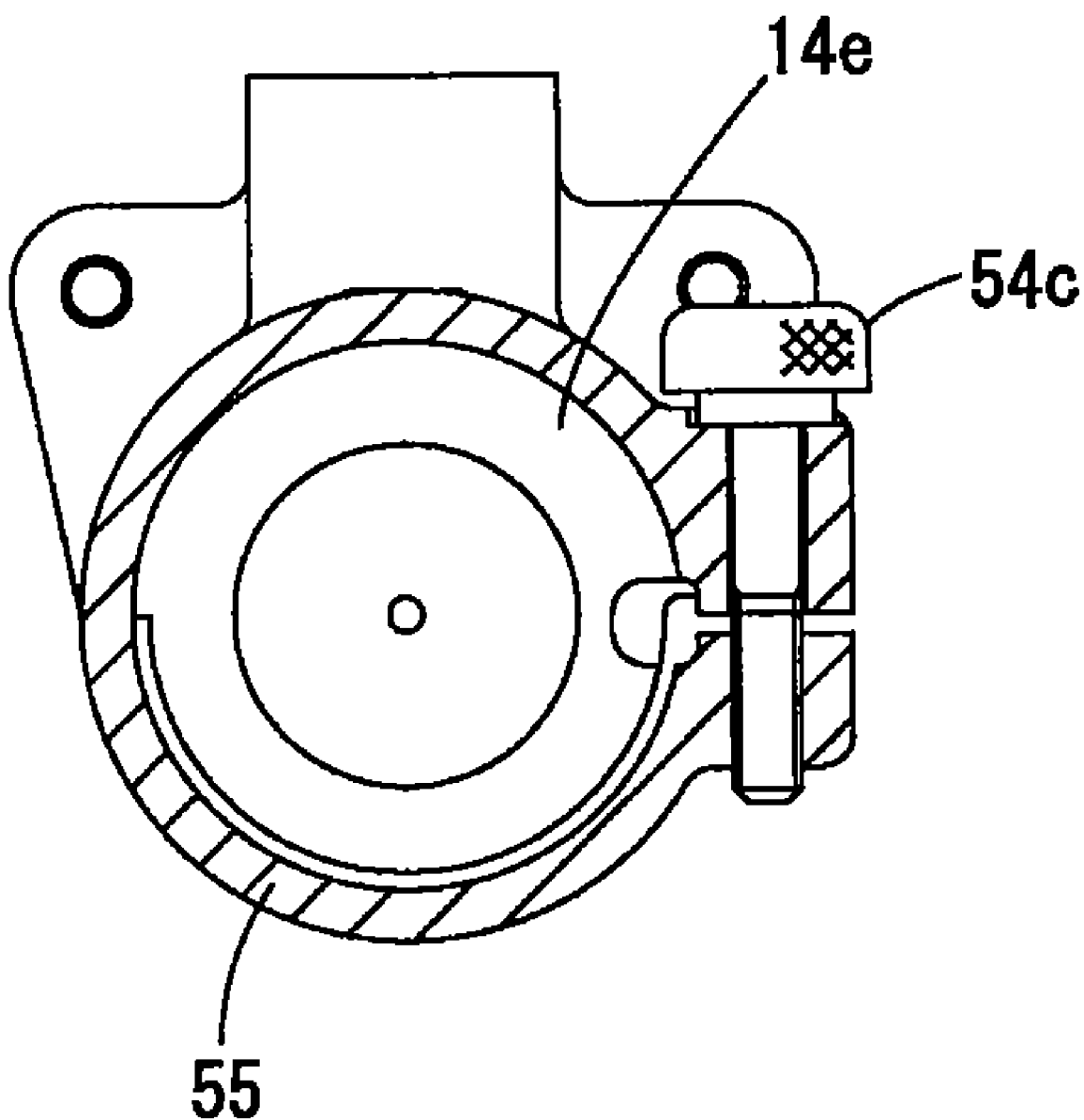
FIG. 5 is a plan view, partly in section, showing an oil tank mount formed on the machine body.

The tank body 54 is formed on its lower end with a joint 54a connected to the oil tank mount 14b. The joint 54a has a passage 54b through which the oil outlet 52 of the tank body 54 and the through cavity 14c of the oil tank mount 14b are communicated with one another. A rotary valve 60 is disposed within the passage 54b so as to adjust the cross sectional area of the passage 54b and thus regulate the flow of the cutting oil to be supplied to the annular cutter. The rotary valve 60 is adjustably operated by means of a lever 60a. As shown in FIGS. 1 and 3, the oil tank mount 14b has a small diameter portion 14d and a large diameter portion 14e located below the small diameter portion 14d. The joint 54a of the oil tank is fitted over these two portions. As shown in FIG. 5, the joint 54a has a clamping ring or slit ring 55 disposed about the large diameter portion of the oil tank mount 14b and a fastener or screw 54c adapted to secure the clamping ring 55 around the large diameter portion of the oil tank mount 14b.

In the illustrated embodiment, the tank body 54 has a passage 54d defined above the proximal rotary shaft 22 and adapted to provide a communication between the passage 54b and the interior of the tank body 54 through a check valve 66. When the arbor is moved toward its retracted position, an upward flow of air is permitted to enter the interior of the tank body 54 through the check valve 66.

The tank body 54 includes a bottom wall 54e located adjacent to the machine body 14, a peripheral wall 54f extending from the peripheral edge of the bottom wall 54e in a direction away from the machine body 14, and a top wall 54g connected to the peripheral wall and separated a predetermined distance from the bottom wall 54e. The oil outlet 52 (located in the left section of the oil tank as shown in FIGS. 1 and 3) is formed in the bottom wall 54e adjacent to the peripheral wall 54f. As shown in FIG. 1, the tank body horizontally extends from the central axis of the arbor more to the right than to the left. In addition, the right side of the bottom wall 54e projects toward the machine body relative to the left side of the bottom wall 54e.

The tank body 54 has an interior space. The interior space is divided into a first interior part and a second interior part by an imaginary plane containing the central axis of rotation of the arbor. In FIGS. 1 and 3, the imaginary plane extends normal to the sheets. The first interior part is less in volume than the second interior part. The tank body 54 is mounted to the machine body and oriented in the desired angular position about the central axis of rotation of the arbor so that the first interior part is located below the second interior part.

Figure 6:
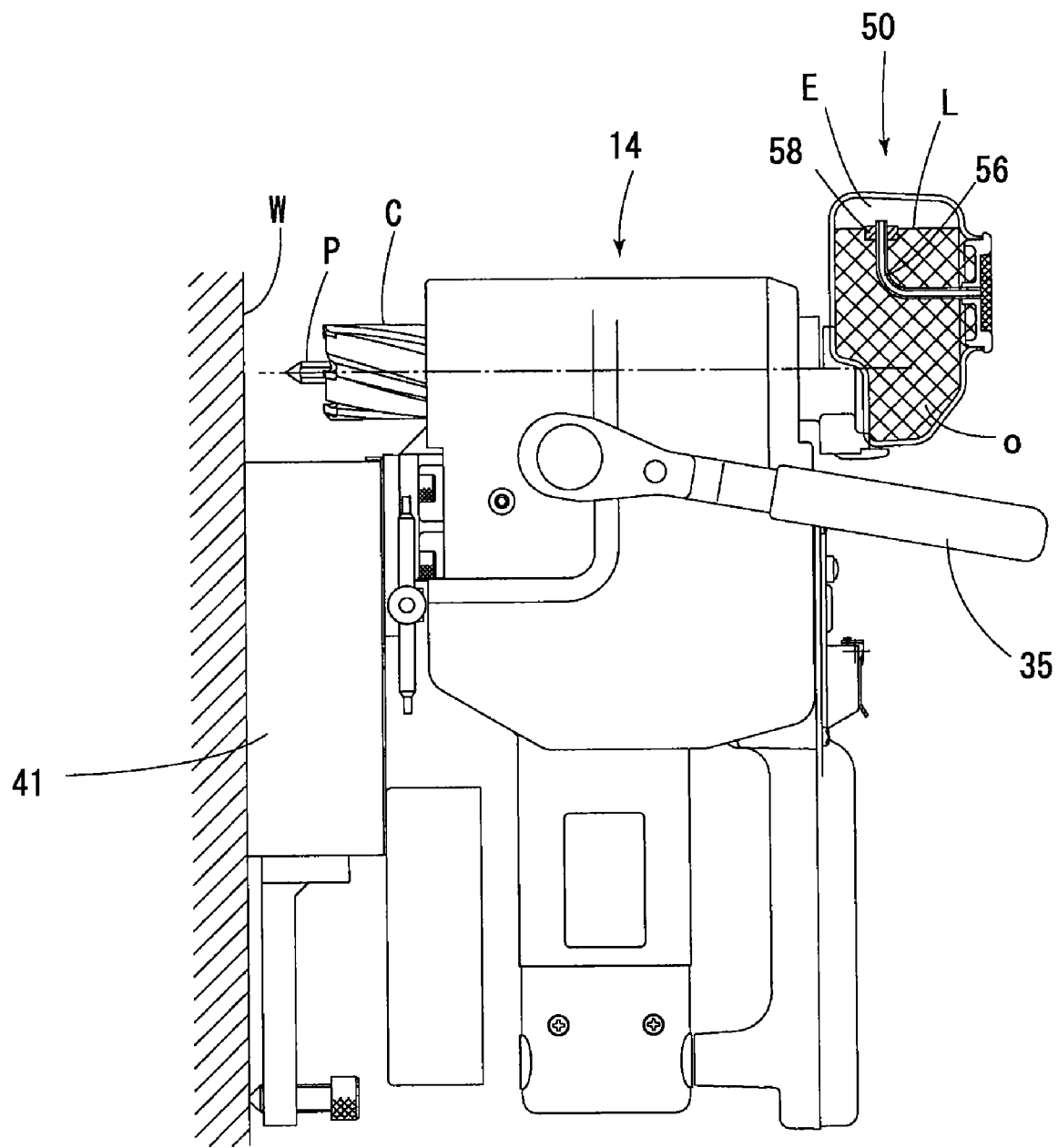
FIG. 6 is a side view of the rotary cutting machine as rotated from a horizontal orientation shown in FIG. 1 to a vertical orientation.

FIG. 6 shows that the rotary cutting machine is attached to the workpiece W which is oriented in a vertical direction rather than in a horizontal direction as shown in FIGS. 1 to 3. In this embodiment, the oil tank 50 is mounted to the machine body 14 so that the first interior part of the tank body is located below the second interior part. This arrangement allows the level of the cutting oil O to be higher than the annular cutter as compared the case where the oil tank is positionally maintained as it was relative to the machine body, in other words, the oil tank is placed upside down from the state shown in FIG. 6. Better supply of cutting oil results.

Figure 7:
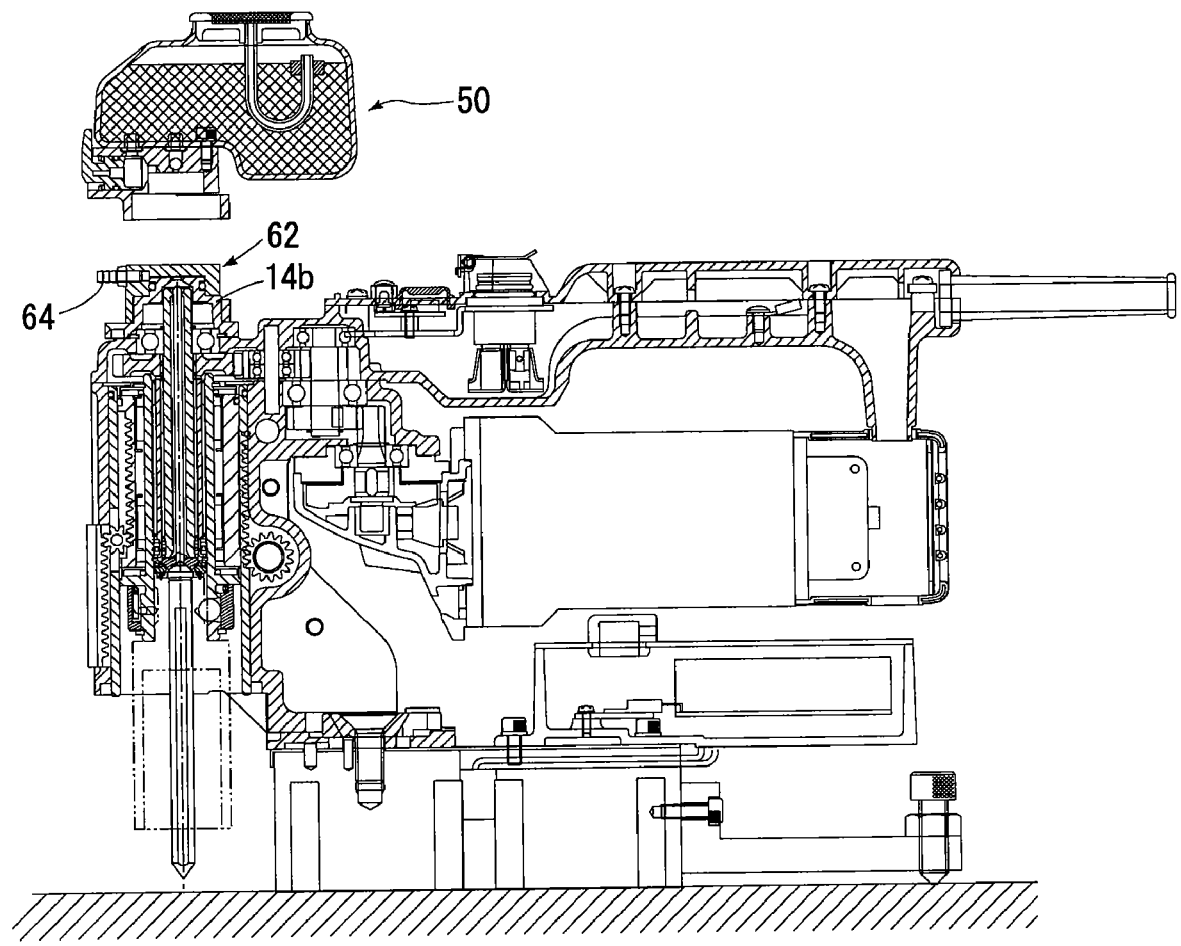
FIG. 7 shows the manner in which a hose fitting is mounted to the oil tank mount of the machine body after an oil tank is removed.

Referring to FIG. 7, the oil tank 50 may need to be removed, for example, in the event that the rotary cutting machine is used in a small or narrow site. In such a case, a hose adapter or fitting 62 may preferably be mounted to the oil tank mount 14*b* of the machine body. The hose fitting 62 is in the form of a cap fitted over the oil tank mount 14*b* and includes an outwardly extending connector or nipple 64. The nipple 64 is connected through to an external hose to a remote oil source (not shown).

What is claimed is:

1. A rotary cutting machine comprises:
   a machine body including a rotatable arbor having a central axis of rotation and adapted to hold a rotary cutting tool, said rotary cutting tool being rotated with said arbor about said central axis of rotation,
   wherein said arbor comprises:
   a proximal rotary shaft mounted to said machine body for rotation about said central axis of rotation and drivingly connected to a motor;
   an intermediate rotary shaft telescopically connected to said proximal rotary shaft and movable between an extended position wherein said proximal rotary shaft and said intermediate rotary shaft are axially overlapped with one another by a relatively short axial length and a retracted position wherein said proximal rotary shaft and said intermediate rotary shaft are axially overlapped with one another by a relatively long axial length, said intermediate rotary shaft being rotated with said proximal rotary shaft;
   a distal rotary shaft having a leading end, said distal rotary shaft being telescopically connected to said intermediate rotary shaft and moved between an extended position wherein said intermediate rotary shaft and said distal rotary shaft are axially overlapped with one another by a relatively short axial length and a retracted position wherein said intermediate rotary shaft and said distal rotary shaft are axially overlapped with one another by a relatively long axial length, said distal rotary shaft being rotated with said intermediate rotary shaft, said rotary cutting tool being secured to said leading end of said distal rotary shaft;
   a cylindrical holder for rotatably supporting said distal rotary shaft, said cylindrical holder being mounted to said machine body so that said cylindrical holder is axially movable with said distal rotary shaft; and
   a cylindrical guide axially movably mounted to said machine body and adapted to axially movably hold and rotationally secure said cylindrical holder;
   said rotary cutting machine further comprising a feed mechanism including:
   a first pinion rotatably mounted to said machine body;
   a first rack formed on an outer peripheral surface of said cylindrical holder and extending parallel to said central axis of rotation;
   a second rack formed on an outer peripheral surface of said cylindrical guide and extending parallel to said central axis of rotation, said second rack being meshed with said first pinion;
   a third rack formed on said machine body and extending parallel to said first rack; and
   a second pinion rotatably mounted to said cylindrical guide and meshed with said first and third racks,
   said cylindrical guide being axially displaced upon rotation of said first pinion to cause said second pinion to be moved along said third rack so that through said first rack, said distal rotary shaft and said intermediate rotary shaft are moved between said respective extended and retracted positions.

2. A rotary cutting machine according to claim 1, wherein said motor includes an output shaft, said output shaft extending perpendicular to said central axis of rotation of said arbor.

* * * * *